United States Patent
Rabinowitz

(10) Patent No.: US 11,407,046 B2
(45) Date of Patent: Aug. 9, 2022

(54) BAND SAW WITH EXPANDED CUTTING SECTION

(71) Applicant: Strategic Design LLC, Hillsborough, NJ (US)

(72) Inventor: Jonathan Rabinowitz, Florida, NY (US)

(73) Assignee: Strategic Design LLC

( * ) Notice: Subject to any disclaimer, the term of this patent is extended or adjusted under 35 U.S.C. 154(b) by 0 days.

(21) Appl. No.: 16/698,305

(22) Filed: Nov. 27, 2019

(65) Prior Publication Data
US 2020/0171589 A1    Jun. 4, 2020

Related U.S. Application Data

(60) Provisional application No. 62/771,746, filed on Nov. 27, 2018.

(51) Int. Cl.
*B23D 53/12*    (2006.01)
*B23D 55/06*    (2006.01)

(52) U.S. Cl.
CPC .......... *B23D 53/12* (2013.01); *B23D 55/06* (2013.01)

(58) Field of Classification Search
CPC ........ B23D 53/12; B23D 55/06; B23D 55/08; B23D 55/082; B23D 55/00; Y10T 83/707; Y10T 83/7226; Y10T 83/7264
USPC .................... 30/380; 83/788, 793, 809, 820; D15/134; D8/64
See application file for complete search history.

(56) References Cited

U.S. PATENT DOCUMENTS

| | | | | |
|---|---|---|---|---|
| 3,680,421 A * | 8/1972 | Conner | ................. | B23D 55/10 83/814 |
| 4,193,192 A * | 3/1980 | Cortez | ................. | B23D 53/12 83/820 |
| 4,212,104 A * | 7/1980 | Wikoff | ................. | B23D 53/12 30/380 |
| 4,597,132 A * | 7/1986 | Elmer | ................. | B23D 55/082 452/160 |
| 2002/0144583 A1* | 10/2002 | Kramski | ............... | B30B 15/041 83/613 |
| 2002/0170400 A1* | 11/2002 | Gass | ...................... | B27G 21/00 83/788 |
| 2004/0076348 A1* | 4/2004 | Dalessandro | ......... | F16C 29/069 384/43 |
| 2004/0158996 A1 | 8/2004 | McIntosh | | |

(Continued)

FOREIGN PATENT DOCUMENTS

JP    2015208831 A    11/2015

OTHER PUBLICATIONS

The difference between plain, ball, and roller bearings; Sosa, (Year: 2018).*

*Primary Examiner* — Evan H Macfarlane
*Assistant Examiner* — Fernando A Ayala
(74) *Attorney, Agent, or Firm* — Gearhart Law LLC; Richard Gearhart

(57) ABSTRACT

A band saw with an expanded cutting section is provided. The band saw includes left and right semicircular shaped bearing assemblies. A saw blade overlaps the left and right semicircular bearing assemblies. An external housing encloses the left and right bearing assemblies and the saw blade. The expanded cutting section is carved into the external housing and extends in between bottom tips of the left and right bearing assemblies.

9 Claims, 6 Drawing Sheets

(56) References Cited

U.S. PATENT DOCUMENTS

| | | | |
|---|---|---|---|
| 2005/0252355 A1* | 11/2005 | Liao | B23D 55/10 83/581.1 |
| 2006/0037448 A1* | 2/2006 | Snodgrass | B23D 55/10 83/13 |
| 2008/0005912 A1* | 1/2008 | McIntosh | B23D 53/12 30/380 |
| 2009/0265943 A1 | 10/2009 | Miller et al. | |
| 2010/0192399 A1 | 8/2010 | Sawabe et al. | |
| 2011/0119934 A1* | 5/2011 | Bertsch | B23D 53/12 30/380 |
| 2012/0055312 A1* | 3/2012 | Mizutani | B23D 55/082 83/820 |
| 2016/0039022 A1* | 2/2016 | Carden | B27B 15/02 83/73 |
| 2016/0158857 A1* | 6/2016 | Sakai | B23D 55/082 83/813 |

* cited by examiner

BAND SAW WITH EXPANDED CUTTING SECTION

CLAIM OF PRIORITY

This application is a United States utility application having priority to U.S. provisional application Ser. No. 62/771,746, filed Nov. 27, 2018 entitled "BAND SAW WITH EXPANDED CUTTING SECTION", the entirety of which is hereby incorporated by reference as if fully set forth herein.

FIELD OF THE EMBODIMENTS

The field of the present invention and its embodiments relate to a band saw with an expanded cutting section that incorporates semicircular bearing assemblies that allocate additional space to the cutting section.

BACKGROUND OF THE EMBODIMENTS

Motorized tools are an integral part of daily life. Motorized tools, such as drills, nail guns, and/or saws, among others automate manual tasks and significantly impact work flows associated with tool use. For example, a worker with nails and a hammer may complete a wall construction within a time period. The same worker with a nail gun may construct multiple walls within the same time period. As such, motorized tools impact productivity and efficiency by enabling faster output.

A band saw is an example of a motorized tool. The band saw is used to cut pipes among other items. The band saw includes a saw blade that is overlaid and contained by two wheels. The wheels and the saw blade are enclosed in an external housing. The saw blade is driven by a motor that is integrated into the external housing. A cutting operation is performed in an opening (the cutting section) within the external housing in between the two wheels. The size of the wheels constrict the size of the cutting section. Examples of the band saw are provided below.

For instance, JP 2015/208831A pertains to a portable band saw machine. The band saw includes two saw wheels, a motor that drives the saw wheel or wheels and a saw blade or blades. Previous components, guides for holding the saw, a guide plate are enclosed in a housing in a rotatable state. In the portable band saw machine, an opening is formed so as to be large in a lateral direction, and a distance between the saw guides is modifiable.

US 2004/0158996 A1 pertains to a hand-held band saw. The band saw has a frame and a handle extending from a longitudinal edge of the frame at an acute angle and opposite an edge containing a throat for receiving the work piece. The orientation of the handle centers the mass of the saw below the hand and positions the cutting section of the blade in a vertical plane so it will engage a work piece at a preferred angle selected by the user.

US 2009/0265943 A1 pertains to a portable band saw that includes a serviceable/replaceable bumper system for allowing the band saw to be easily repaired if damaged from being dropped.

US 2010/0192390 A1 pertains to another hand-held band saw for one-handed operation.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

The present invention and its embodiments relate to a band saw with an expanded cutting section. In an example embodiment of the present invention, the band saw may include a left bearing assembly. the left bearing assembly may be shaped in a semicircular shape. The band saw may also include a right bearing assembly. The right bearing assembly may also be shaped in the semicircular shape. The band saw may further include a saw blade. The saw blade may overlap the left and right bearing assemblies. The band saw may also include an external housing. The external housing may enclose the left and right bearing assemblies and the saw blade. The cutting section may be carved into the external housing. The cutting section may extend in between bottom tips of the left and right bearing assemblies.

In another embodiment of the present invention, a band saw system is described. The system may include left top and bottom bearing assemblies. The left top and bottom bearing assemblies may each be shaped in a quarter circular shape. Furthermore, the system may include right top and bottom bearing assemblies. The right top and bottom bearing assemblies may each be shaped in the quarter circular shape. The system may also include a saw blade. The saw blade may overlap the left top and bottom bearing assemblies and the right top and bottom bearing assemblies. Additionally, the system may include an external housing. The external housing may enclose the left top and bottom bearing assemblies, the right top and bottom bearing assemblies, the saw blade, a handle, and a motor that is integrated to the handle. The motor may rotate the saw blade. The cutting section may also be carved into the external housing. The cutting section may extend in between bottom tips of the left and right bottom bearing assemblies.

In yet another embodiment of the present invention, a method of providing a band saw with an expanded cutting section is described. In an example scenario, a saw blade may be overlaid on bearing assemblies. The saw blade, the bearing assemblies, a handle, and a motor may be enclosed in an external housing. The motor may be integrated into the handle. The motor may be configured to rotate the saw blade. The cutting section may be carved into the external housing. The cutting section may span an area in between the bearing assemblies.

It is an object of the present invention to provide a band saw with an expanded cutting section that uses bearing assemblies to contain a saw blade.

It is an object of the present invention to use the bearing assemblies with a semicircular shape.

It is an object of the present invention to provide a larger cutting section compared to legacy solutions by using the bearing assemblies with the semicircular shape.

It is an object of the present invention to provide an external housing with a smaller footprint compared to legacy solutions while maintaining a same size cutting section.

It is an object of the present invent to provide a configurable cutting section that is able to enlarge and reduce based on user demand.

DESCRIPTION OF THE PREFERRED EMBODIMENTS

Figure 1A:
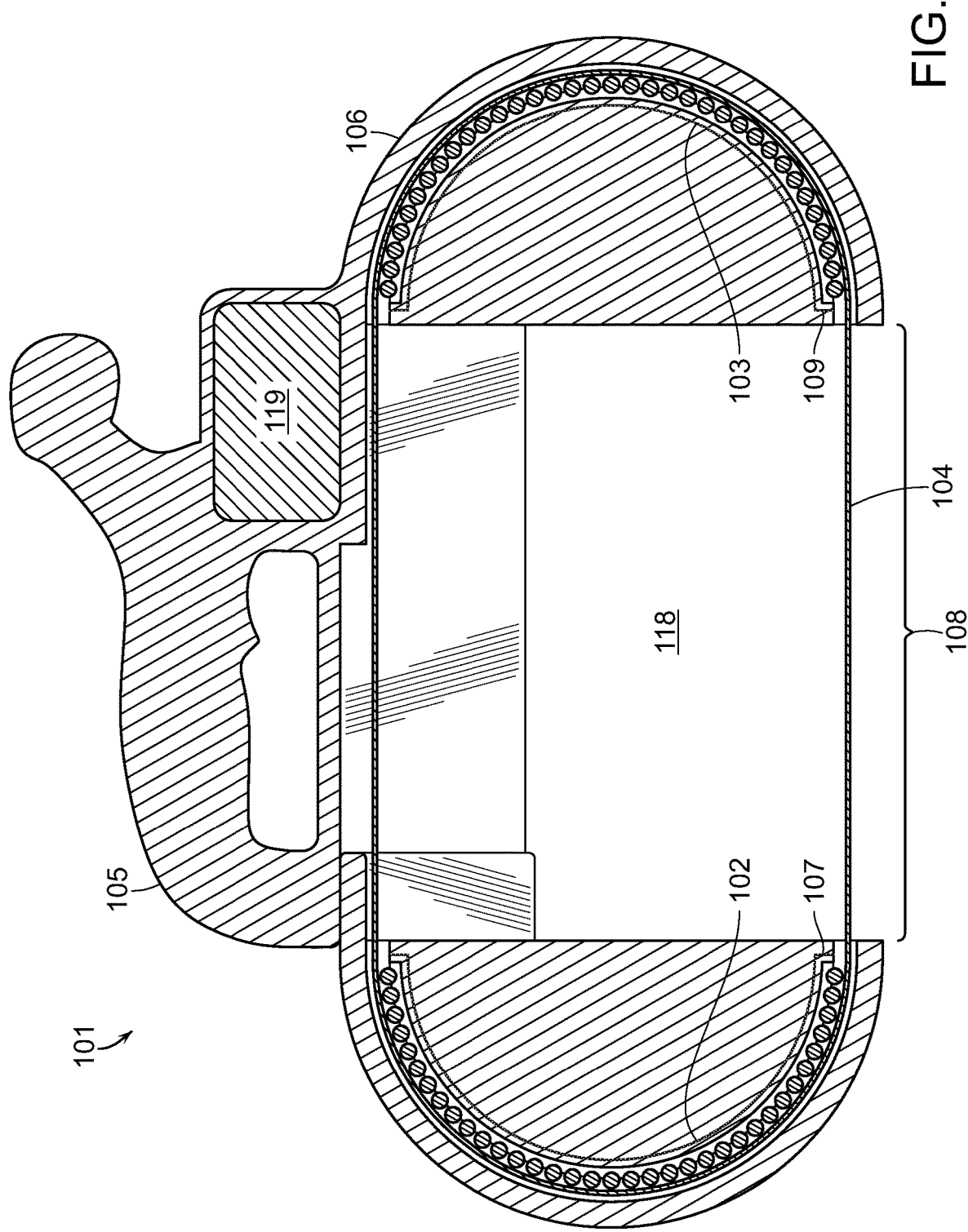
FIG. 1A shows a sectional view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1A shows a band saw 101 with an expanded cutting section 118. The band saw 101 may be used to cut objects with a rotational saw. The band saw 101 may include the cutting section 118. A saw blade 104 may operate through the cutting section 118 to cut an object such as a pipe, a rod, and/or a bolt, among others. An external housing 106 of the band saw 101 may include the cutting section 118 that accommodates the object during a cutting operation.

The band saw 101 may include a left bearing assembly 102, a right bearing assembly 103, the saw blade 104, and the external housing 106 that encloses the components. Alternatively, the external housing may enclose either the left or right bearing assemblies (102 or 103) and a wheel instead of one of the bearing assemblies (102 or 103), and the saw blade 104. As such, the saw blade 104 may be overlaid on wheel(s) in combination with the bearing assemblies (102 or 103). Alternatively, the saw blade 104 may be overlaid on wheels (instead of the bearing assemblies 102 or 103) in an embodiment that may save production costs by minimizing or eliminating the bearing assemblies (102 or 103).

The external housing may be made from a metal, a plastic, and/or a composite material, among others. Each of the left and right bearing assemblies (102 and 103) may be made of a semicircular shaped bearing housing. The bearing housing may enclose ball bearings within a channel shaped structure. The saw blade 104 may be contained by the channel shape during rotational operation.

The cutting section 118 may stretch in between a bottom tip 107 of the left bearing assembly 102 and a bottom tip 109 of the right bearing assembly 103. An advantage of utilizing the semicircular shaped bearing assemblies (102 and 103) may include providing the cutting section 118 that is larger than legacy solutions. An extended width 108 of the cutting section 118 may enable the band saw 101 to cut larger objects compared to legacy solutions. Furthermore, the extended width 108 of the cutting section 118 may allow for larger dimensions for the cutting section 118. The larger dimensions of the cutting section 118 may enable the cutting operation of an object with a larger depth. A legacy solution may be unable to cut the object with the larger depth.

The external housing 106 may also include a handle 105. In an example scenario, the handle 105 may enclose a motor 119. The motor 119 may rotate the saw blade 104. The motor 119 may be enclosed within the handle 105 to maximize space usage and space availability for the cutting section 118.

Figure 1B:
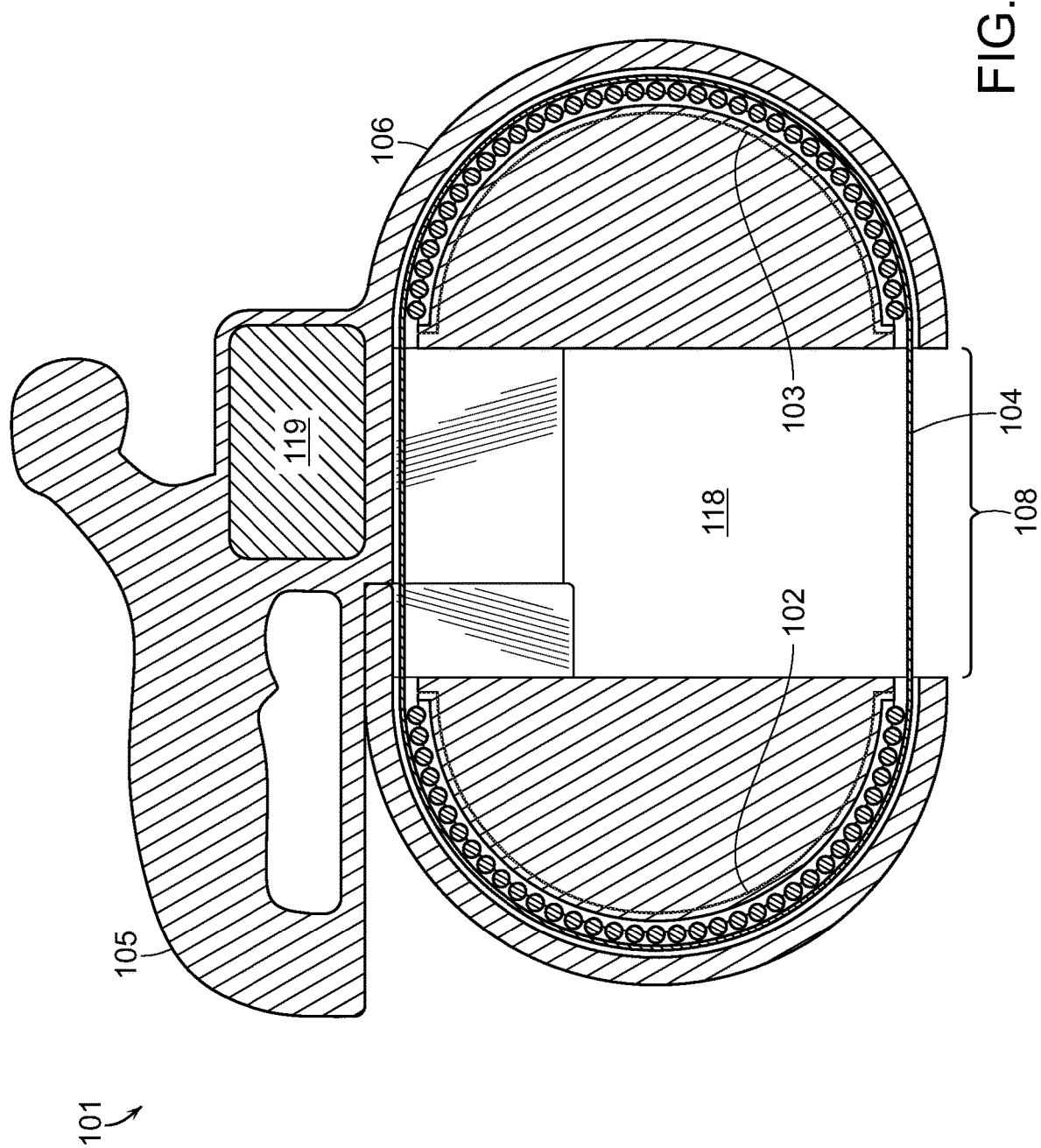
FIG. 1B shows another sectional view of an embodiment of the present invention.

FIG. 1B shows the band saw 101 in a reduced state. A user may be enabled to change the width 108 of the cutting section to configure the cutting section 118 with optimum dimensions for a cutting operation. For example, the user may desire to shrink the cutting section 118 for a cutting operation of an object with a smaller diameter such as a rod and/or a bolt, among others. Alternatively, the user may desire to enlarge the cutting section 118 for a cutting operation of an object with a larger diameter such as a pipe, among others.

In another example scenario, the external housing 106 may include components to allow the user to compress and expand the band saw 101. For example, the user may push or pull on the side(s) of the external housing 106 to decrease or increase the width 108 of the cutting section 118. A pull action may move the left and/or right bearing assemblies (102 and/or 103) to enlarge a distance between the left and right bearing assemblies (102 and 103). As a result, the width 108 of the cutting section 118 may be increased. Alternatively, a push action (by the user) may move the left and/or right bearing assemblies (102 and/or 103) to shrink a distance between the left and right bearing assemblies (102 and 103). As a result, the width 108 of the cutting section 118 may be decreased.

A length of the saw blade 104 may be manually or automatically configured as a result of a modification action. For example, a user may remove the saw blade 104 prior to modifying or changing the width 108 of the cutting section 118. Upon completion of the modification action, the user may install a new saw blade with another length that accommodates the new width of the cutting section 118.

The pathway of the saw blade 104 (through the motor, the left and/or right bearing assemblies 102 and/or 103) may also be automatically configured to accommodate a change in the width 108 of the cutting section 118. For example, the saw blade 104 may operate through a pulley on a track perpendicular to the width 108 of the cutting section 118. In response to an expansion operation, the pulley may be configured to slide in an initial direction to release an additional length of the saw blade 104. Resulting additional length of the saw blade 104 may accommodate an extension to the width 108 of the cutting section 118.

Alternatively, the pulley may be configured to slide in an opposite direction to withhold an excess length of the saw blade 104 that resulted from a reduction operation. The excess length of the saw blade 104 may be withheld to accommodate a reduction to the width 108 of the cutting section 118.

Figure 2A:
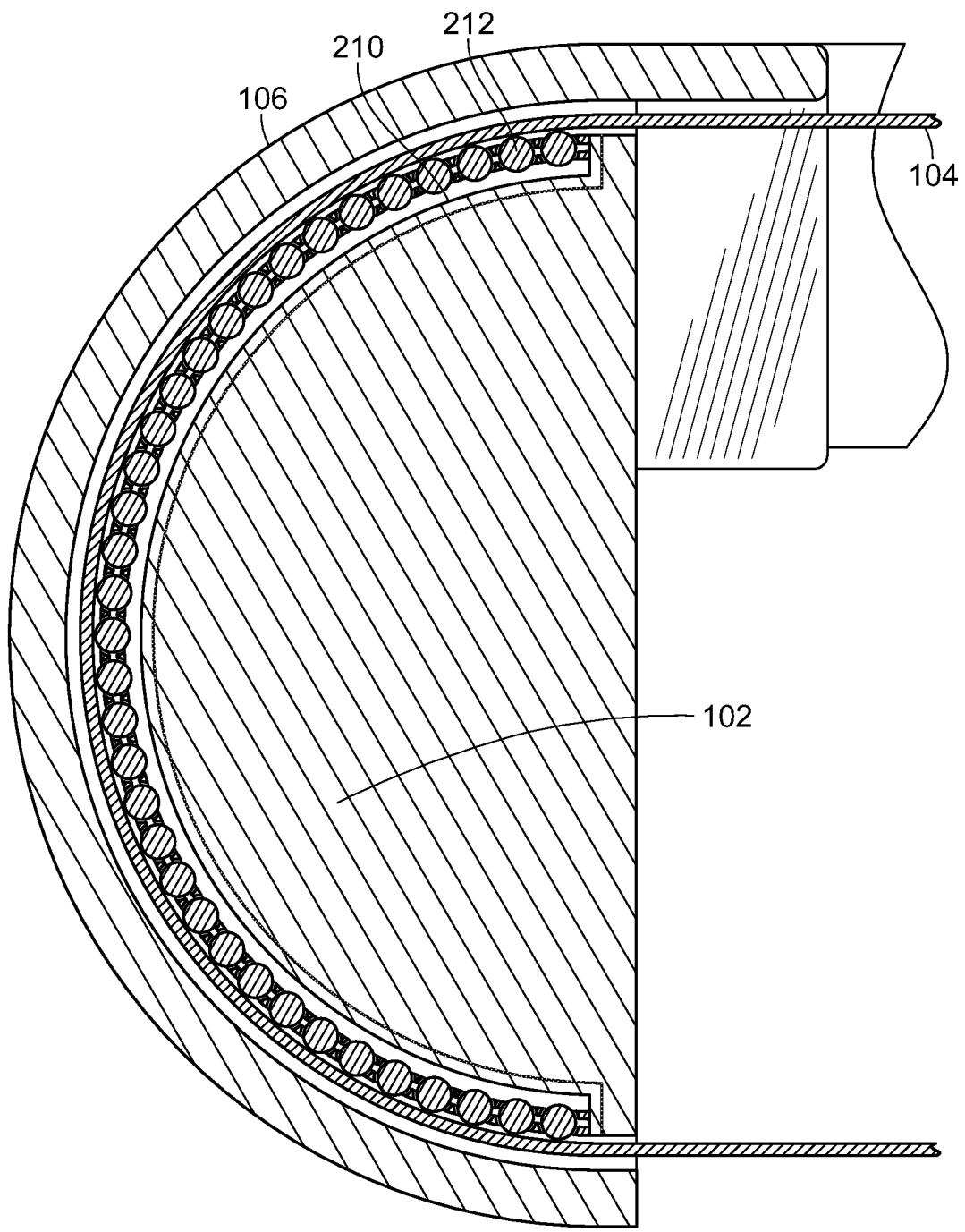
FIG. 2A shows a sectional view of a bearing assembly associated with the present invention.

FIG. 2A shows components associated with the left bearing assembly 102. The left bearing assembly 102 may be composed of a bearing housing 210 and bearings 212. The bearing housing may be composed of a metal, a plastic, and/or a composite material, among others. The bearing housing 210 may enclose the bearings 212. The saw blade 104 may be overlaid on the bearings 212 and operate by traveling on top of the bearings 212. The bearing housing 210 may include a channel shape to contain the saw blade 104 during a cutting operation. The channel shape of the bearing housing 210 may prevent the saw blade 104 from sliding out of the left bearing assembly 102 during the operation. In addition, the bearing housing 212 may be integrated to the external housing 106.

The left bearing assembly 102 may have a semicircular shape to maximize the width 108 of the cutting section 118 between bottom tips of the left bearing assembly 102 and a right bearing assembly. Alternatively, the bearing housing 210 may include other shapes. For example, a bracket or semi oblong based shape may maximize space availability and further increase the width 108 of the cutting section 118 between the bearing assemblies.

Figure 2B:
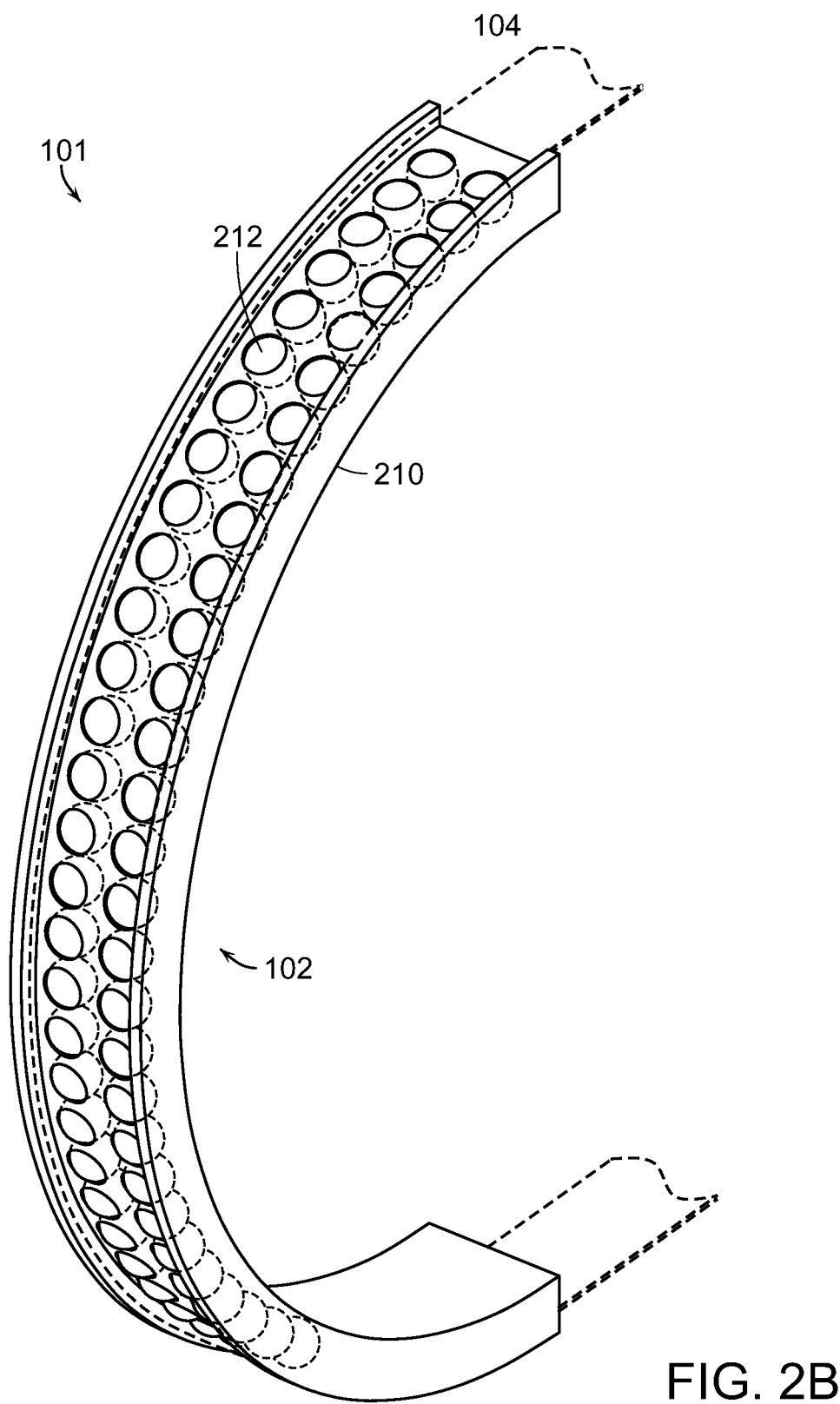
FIG. 2B shows a side view of the bearing assembly associated with the present invention.

FIG. 2B shows a side view of the left bearing assembly 102. The left bearing assembly 102 may include the bearing housing 210 and the bearings 212. The left bearing assembly 102 may have a semicircular shape. The bearing housing 210 may enclose the bearings 212 within a channel shape with side walls. The channel shape may contain the saw blade 104. The saw blade 104 may rotate on top of the bearings 212 during a cutting operation. The side walls of the bearing housing 210 may prevent the saw blade 104 from sliding off the left bearing assembly 102 during the cutting operation.

Alternatively, a wheel may be used instead of the left bearing assembly 102. The band saw 104 may be overlaid on the wheel. The wheel may have a circular shape and include a channel shape. The band saw 104 may be enclosed on contained by the channel shape. The wheel may rotate with the band saw 104 during a cutting operation.

Figure 3:
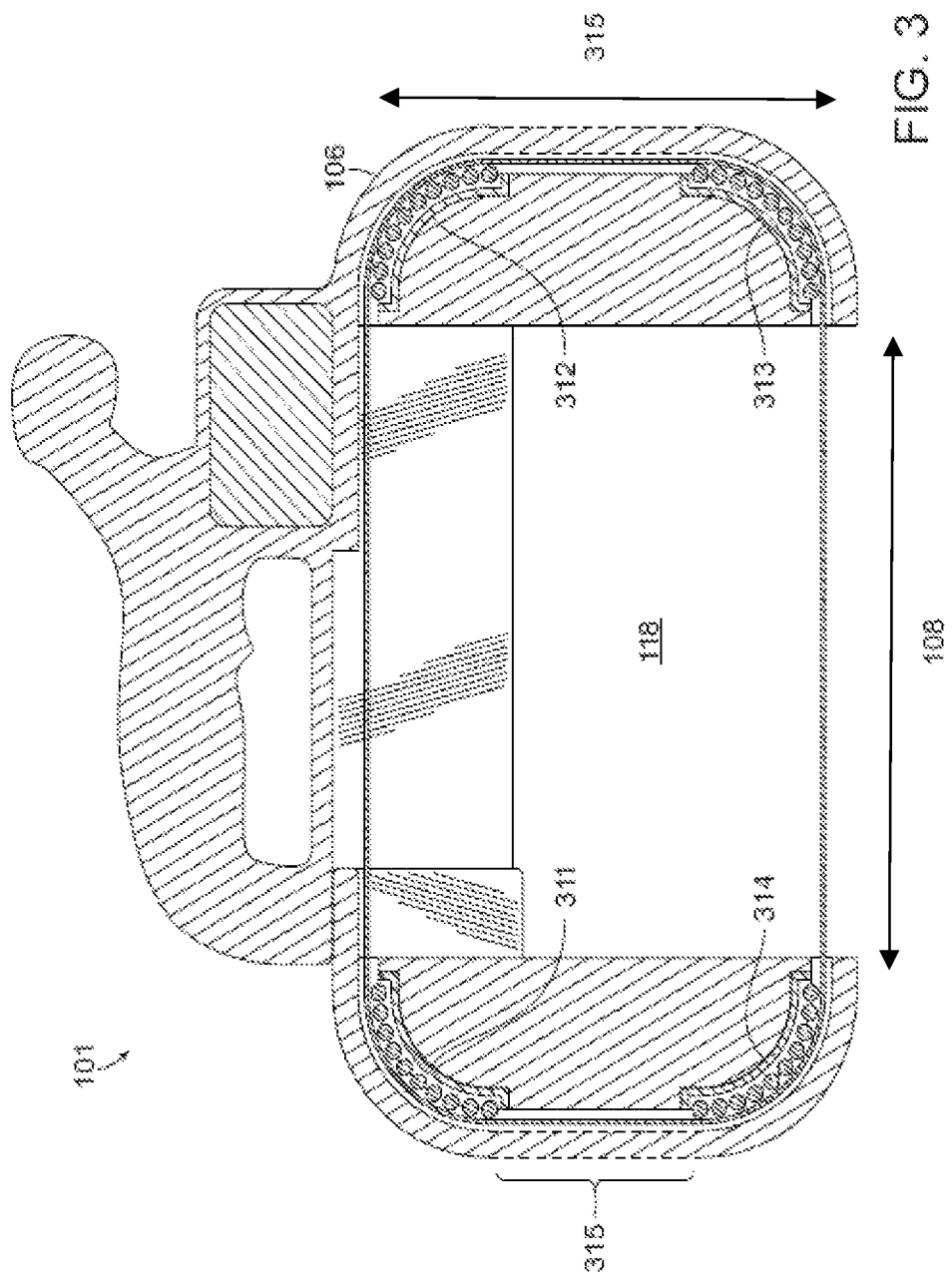
FIG. 3 shows a sectional view of another embodiment of the present invention.

FIG. 3 shows the band saw 101 with four bearing assemblies. The band saw 101 may include a left top bearing assembly 311, a left bottom bearing assembly 314, a right top bearing assembly 312, and a right bottom bearing assembly 313. Size of each of the bearing assemblies (311, 312, 313, and 314) may be smaller compared to an embodiment using two bearing assemblies. As such, the width 108 of the cutting section 118 may be longer compared to an embodiment with two bearing assemblies in the same external housing 106. Alternatively, the bearing assemblies (311, 312, 313, and 314) with smaller sizes may allow for the external housing 106 to be smaller than the embodiment with two bearing assemblies while maintaining the same width 108 of the cutting section 118.

The user may change the width 108 of the cutting section 118 by changing a distance between the left top and bottom bearing assemblies (311 and 314) and the right top and bottom bearing assemblies (312 and 313). Alternatively, the user may modify a height 315 of the cutting section 118 by changing a distance between the top left and right bearing assemblies (311 and 312) and the bottom left and right bearing assemblies (314 and 313). The user may push or pull on the sides of the external housing 106 to change the width 108 of the cutting section 118. Similarly, the user may push or pull on a top and/or a bottom of the external housing 106 to change the height 315 of the cutting section 118.

Alternatively, wheel(s) may be used instead of or in combination with the bearing assemblies (311, 312, 313, and/or 314). The saw blade may be overlaid on the wheel(s) and/or the bearing assemblies (311, 312, 313, and/or 314). Wheel(s) may be used instead of the bearing assemblies (311, 312, 313, and/or 314) to reduce production costs.

Figure 4:
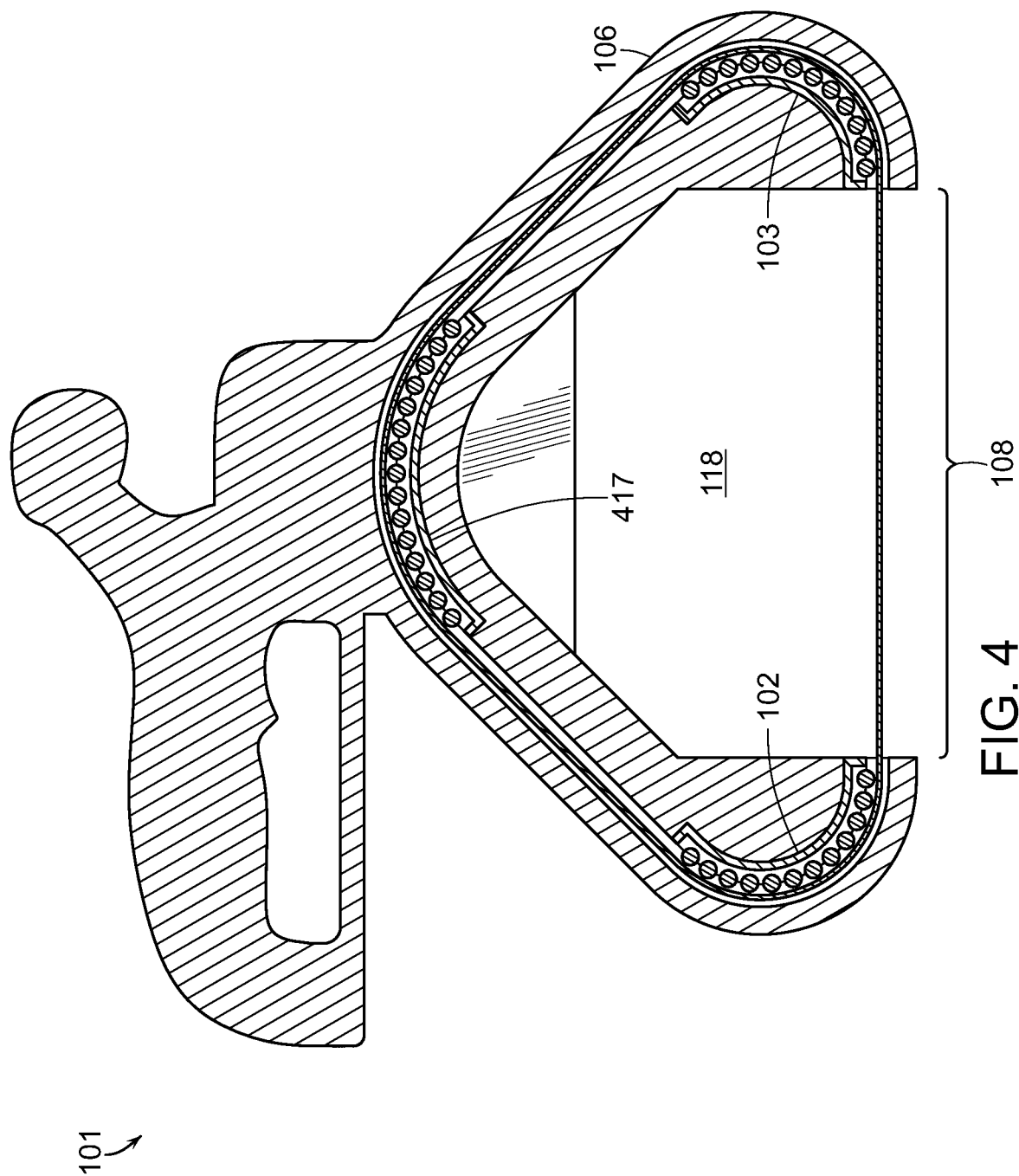
FIG. 4 shows a sectional view of yet another embodiment of the present invention.

FIG. 4 shows the band saw 101 having a triangular shape. The band saw 101 may have the left bearing assembly 102, the right bearing assembly 103, a top bearing assembly 417 enclosed by the external housing 106. The bearing assemblies (102, 417, and 103) may have triangular shapes. The triangular shapes may allow the band saw 101 to maintain the same width 108 of the cutting section 118 compared to embodiments with two or more bearing assemblies. However, the external housing 106 of the band saw 101 may have a smaller size due to the triangular shaped bearing assemblies (102, 417, and 103). As such, the external housing 106 may have a smaller footprint compared to embodiments with two or four bearing assemblies.

Alternatively, wheel(s) may be used instead of or in combination with the bearing assemblies (102, 103, and/or 417). The saw blade may be overlaid on the wheel(s) and/or the bearing assemblies (102, 103, and/or 417). Wheel(s) may be used instead of the bearing assemblies (102, 103, and/or 417) to reduce production costs.

A method of providing a band saw with an expanded cutting section is also described. In an example scenario, a saw blade may be overlaid on bearing assemblies. The saw blade, the bearing assemblies, a handle, and a motor may be enclosed in an external housing. The motor may be integrated into the handle. The motor may be configured to rotate the saw blade. The cutting section may be carved into the external housing. The cutting section may span an area in between the bearing assemblies.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A band saw with an expandable cutting section comprising:
   a first ball bearing assembly, wherein the first ball bearing assembly comprises a semicircular shape;
   a second ball bearing assembly, wherein the second ball bearing assembly comprises a semicircular shape;
   a saw blade, wherein the saw blade is configured to overlap the first and second ball bearing assemblies;
   an external housing, wherein the external housing encloses the first and second ball bearing assemblies and the saw blade; and
   the cutting section carved into the external housing, wherein the cutting section extends in between bottom tips of the first and second ball bearing assemblies, and a width and a height of the cutting section is modifiable wherein the width of the cutting section is changed by moving one or more of the first ball bearing assembly and the second ball bearing assembly, and wherein the height of the cutting section is changed by moving one or more of the first ball bearing assembly and the second ball bearing assembly.

2. The band saw of claim 1, wherein each of the first and second ball bearing assemblies comprises a semicircular housing enclosing a plurality of ball bearings with the plurality of ball bearing in each of the first and second ball bearing assemblies arranged in at least two columns and at least two rows.

3. The band saw of claim 2, wherein the semicircular housing includes a channel shape structure to contain the saw blade.

4. The band saw of claim 1, wherein the external housing further comprises:
   a handle; and
   a motor, wherein the motor is configured to rotate the saw blade.

5. The band saw of claim 4, wherein the motor is integrated into the handle.

6. The band saw of claim 1, wherein the width of the cutting section is increased by moving one or more of the first and second ball bearing assemblies to enlarge a distance between the first and second ball bearing assemblies.

7. The band saw of claim 1, wherein the width of the cutting section is decreased by moving one or more of the first and second ball bearing assemblies to shrink a distance between the first and second ball bearing assemblies.

8. The band saw of claim 1, wherein the width of the cutting section is configured with actions that include:
   a removal of the saw blade;
   a modification of the width of the cutting section with a movement of one or more of the second and first ball bearing assemblies; and
   an installation of a new saw blade, wherein a length of the new saw blade accommodates the width of the cutting section.

9. A band saw system comprising:
   a first and a second bearing assemblies, wherein the first and the second ball bearing assemblies each comprise a quarter circular shape;
   a third and a fourth ball bearing assemblies, wherein the third and the fourth ball bearing assemblies each comprise the quarter circular shape;
   a saw blade, wherein the saw blade is configured to overlap the first and the second ball bearing assemblies and the third and the fourth ball bearing assemblies;
   an external housing comprising, a handle, and a motor integrated into the handle, wherein the motor is configured to rotate the saw blade, and wherein the external housing encloses the first and the second ball bearing assemblies, the third and fourth ball bearing assemblies, the saw blade; and
   a cutting section carved into the external housing, wherein the cutting section extends in between bottom tips of the first and the third ball bearing assemblies,
   wherein a width and a height of the cutting section are modifiable,
   wherein the width of the cutting section is changed by moving one or more of the first and the second ball bearing assemblies and the third and the fourth ball bearing assemblies, and
   wherein the height of the cutting section is changed by moving one or more of first and the second ball bearing assemblies and the third and the fourth ball bearing assemblies.

* * * * *